United States Patent
Meyer et al.

[15] 3,676,559
[45] July 11, 1972

[54] LAXATIVES COMPRISING SUBSTITUTED BIO(2-HYDROXY-4-METHYL-5-METHYLTHIOPHENYL)METHANES

[72] Inventors: Ronald J. Meyer; Orville E. Horsley; Herman J. Eichel, all of Cincinnati, Ohio

[73] Assignee: American Hoechst Corporation, New York, N.Y.

[22] Filed: June 22, 1970

[21] Appl. No.: 59,809

Related U.S. Application Data

[62] Division of Ser. No. 740,054, June 28, 1968, Pat. No. 3,579,538.

[52] U.S. Cl.....................424/275, 424/282, 424/337
[51] Int. Cl. .........................................A61k 27/00
[58] Field of Search ..................424/275, 282, 337

[56] References Cited
UNITED STATES PATENTS 2,959,595  11/1960  Beaver et al.................260/332.3
3,489,815  1/1970   Kraus...............................260/613

Primary Examiner—Albert T. Meyers
Assistant Examiner—Frederick E. Waddell
Attorney—Curtis, Morris & Safford

[57] ABSTRACT

Substituted bis(2-hydroxy-4-methyl-5-methylthiophenyl)methane compounds having laxative (cathartic) properties of the general formula:

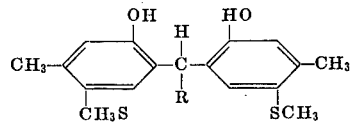

2 Claims, No Drawings

LAXATIVES COMPRISING SUBSTITUTED BIO(2-HYDROXY-4-METHYL-5-METHYLTHIOPHENYL)METHANES

This is a divisional application of Application Ser. No. 740,054 filed June 26, 1968, now U.S. Pat. No. 3,579,538.

The present invention relates to compounds of the formula

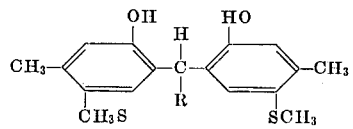

having laxative (cathartic) properties.

Compounds having laxative (cathartic) properties are known, for example, 3,3-bis(p-hydroxyphenyl)phthalide (Phenolphthalein) and 1,8-Dihydroxyanthraquinone (Danthron). The products of the invention have been found to be superior to the compounds named above with respect to their laxative (cathartic) properties and are active in smaller dosages.

In the above formula, the radical R represents an unsubstituted or lower alkyl substituted aromatic, aromatic-heterocyclic or heterocyclic structure. More particularly, R represents a mono or bicyclic, aromatic and/or unsaturated heterocyclic radical containing up to 2 oxygen or up to 1 sulfur ring atoms, the total of the ring atoms not exceeding 10, optionally substituted by a lower alkyl group. By way of example, the following radicals may be mentioned: Naphthyl-(1) and (2), Phenyl Thionaphthyl(2) and (3), 5-Methylthienyl-(2) and 3,4-Methylenedioxyphenyl.

The compounds of the invention are prepared by condensing an aldehyde of the general formula R-CHO with 4-methylthio-m-cresol. The reaction is carried out at temperatures in the range of 0° to 150°C, preferably 5° to 60°C and in the presence of a catalyst. The reaction time is not critical, however, the reactions may proceed from a few minutes to several hours.

Suitable catalysts for the reaction are mineral acids such as sulfuric acid, hydrochloric acid or phosphoric acid. In addition, metal halides such as zinc chloride, aluminum chloride, boron trifluoride and tin tetrachloride and also phosphorous halides, such as phosphorous trichloride may be used. The preferred catalyst is sulfuric acid. If desired, the reaction can be carried out in the presence of solvents. Suitable solvents are aliphatic alcohols with one to five carbons such as methanol, ethanol, propanol, aliphatic carboxylic acids with two to three carbon atoms, such as acetic or propionic acid, and various aliphatic or aromatic hydrocarbons such as benzene, toluene, or xylene, hexane or petroleum ether. In the presence of a solvent, the molar ratio of the aldehyde and the 4-methylthio-m-cresol is about 1 to 2. In the absence of a solvent, it is useful to start the reaction with an excess of the cresol. Instead of the aldehydes, the corresponding acetals or bisulfite addition products can be used as starting materials.

In general, the products according to the process of the invention are obtained by pouring the reaction mixture into a large volume of water. The resulting aqueous suspension may then be neutralized with an alkaline solution, such as sodium hydroxide or sodium carbonate, filtered, and the resulting residue can be purified by crystallization from an appropriate solvent, for example, organic solvents, such as benzene, acetone, or methanol.

The products of the invention have excellent laxative properties and are, therefore, useful for treating constipation in mammals. For instance, the laxative effect can be demonstrated by administering the compounds to rats in doses of 100 milligrams per kg or less. At the same time, the toxicity is very low. No toxic side effects were observed at the above dosage levels.

For the experiments on rats, the compounds were administered by intubation in the form of an aqueous suspension in carboxymethyl cellulose. For practical usage, the compounds are administered orally or rectally, the application forms being those normally used in therapy for laxatives, e.g., tablets, hard and soft gelatin capsules, suppositories, oily and aqueous suspensions, and the like. In these preparations, the active substances may be present in concentrations of 5 to 100 milligrams per dosage unit or, in the case of liquids or suspensions, at concentrations of 0.5 to 50 percent. The excipients used are those inert ingredients common to pharmaceutical practice, e.g., talc, glucose, magnesium stearate, agar agar, tragacanth, vegetable and mineral oils, etc.

EXAMPLE 1

Bis(2-hydroxy-4-methyl-5-methylthiophenyl)naphthyl-1-methane

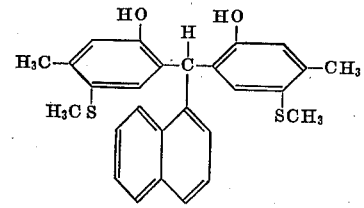

31.2 g 1-Naphthaldehyde and 61.7 g 4-methylthio-m-cresol were dissolved in 100 ml anhydrous methanol and cooled in an ice bath to 5°C. 40 ml concentrated sulfuric acid was added dropwise during 1 hour to the cold solution while stirring. The reaction mixture was subsequently stirred for ten hours at room temperature and allowed to stand at room temperature for another 12 hours. Finally, the reaction mixture was poured into 6 liters of cold water, the pH was adjusted to approximately 9 by means of sodium carbonate solution and the precipitate was removed by filtration. The off-white residue was dissolved in acetone and allowed to crystallize. Recrystallization from acetone yielded an off-white product, mp. 194°–195.5°C.

EXAMPLE 2

Bis(2-hydroxy-4-methyl-5-methylthiophenyl)-3,4-methylenedioxyphenylmethane

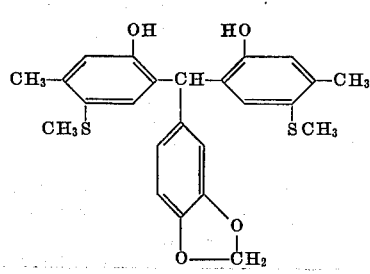

30.1 g Piperonal and 61.6 g 4-methylthio-m-cresol were dissolved in 40 ml anhydrous methanol and cooled to 5°C in an ice bath. 10 ml concentrated sulfuric acid was added dropwise with stirring to the cold solution over 2 hours. 80 ml methanol was added after 12 hours to decrease the viscosity, and the reaction allowed to proceed for a total time of two days. The reaction mixture was poured into 3 liters water and neutralized with aqueous sodium carbonate. The precipitate was collected by vacuum filtration and dissolved in methanol for crystallization. The off-white crystals were recrystallized from methanol yielding a methanol mono solvated product. The compound melts at 95°C with evolution of methanol. The methanol can be removed at elevated temperatures under vacuum.

EXAMPLE 3

Bis(2-hydroxy-4-methyl-5-methylthiophenyl)thionaphthyl-2-methane

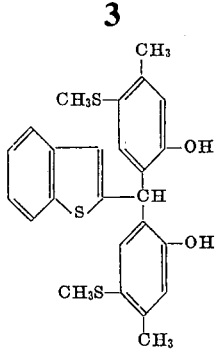

32.4 g 2-Thionaphthenecarboxaldehyde and 61.7 g 4-methylthio-m-cresol were dissolved in 40 ml anhydrous methanol and cooled to 5°C in an ice bath. 32 ml concentrated sulfuric acid was added dropwise with stirring to the cold solution over 2 hours. 40 ml additional methanol was added and the reaction mixture allowed to stand at room temperature for 12 hours, whereupon, an additional 40 ml methanol was added. The contents were poured into water, neutralized with sodium carbonate solution, suction filtered, dissolved in acetone for crystallization. Successive crystallizations from acetone yielded a product, mp. 114°–118°C.

EXAMPLE 4

Bis(2-hydroxy-4-methyl-5-methylthiophenyl)-5-methylthiophene-2-methane

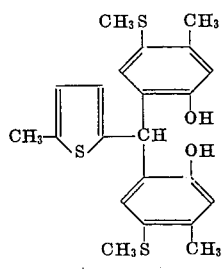

25.2 g 5-Methylthiophene-2-carboxaldehyde and 61.7 g 4-methylthio-m-cresol were dissolved in 40 ml anhydrous methanol. 10 ml concentrated sulfuric acid was added dropwise and the reaction stirred for 24 hours at room temperature. 50 ml additional methanol was added and the reaction mixture poured into 3 liters water containing sodium dithionite. Sodium hydroxide solution was added to dissolve the thick, dark gum and subsequently dilute hydrochloric acid was added to pH 7 causing a precipitate to form which was removed by filtration. The precipitate was dissolved in methanol, treated with sodium borohydride, and poured into water. The resulting light tan precipitate was collected and dried in a vacuum dessicator. The compound decomposes above 60°C.

We claim:

1. A pharmaceutical composition having laxative properties comprising 5 to 100 milligrams of a compound of the formula

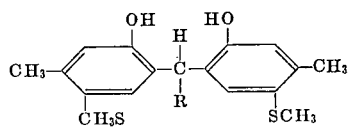

wherein R is an unsubstituted or lower alkyl substituted phenyl, naphthyl, thionaphthyl, thienyl or methylenedioxy phenyl and a pharmaceutical excipient.

2. A process for treating constipation in mammals which comprises orally or rectally administering thereto an effective amount of the composition defined in claim 1.

* * * * *